Patented Sept. 6, 1932

1,876,011

UNITED STATES PATENT OFFICE

MARKUS LARSSON, OF BERLIN, GERMANY, ASSIGNOR TO KUNSTDÜNGER-PATENT-VERWERTUNGS-AKTIENGESELLSCHAFT, OF GLARUS, SWITZERLAND

PROCESS OF PRODUCING AMMONIUM PHOSPHATE

No Drawing. Application filed October 1, 1930, Serial No. 485,826, and in Sweden October 5, 1929.

This invention relates to an improved process of producing ammonium phosphate from phosphate rock by means of sulphuric acid.

Generally, ammonium phosphate is produced from phosphate rock in the following manner. Phosphate rock is dissolved in sulphuric acid and the phosphoric acid solution produced is separated from the insoluble residues and neutralized with ammonia. As the solution always contains a considerable percentage of soluble sulphates, such as the sulphates of calcium, iron and aluminum, etc., which have been formed from other compounds of said metals in the phosphate rock, and further-more some free sulphuric acid, the ammonia added reacts also with said compounds to form ammonium sulphate while insoluble phosphates corresponding to the soluble metal sulphates present in the solution are precipitated. After removal of the precipitate the neutralized solution is concentrated by evaporation and then cooled. In this cooling practically pure ammonium phosphate crystallizes out while the ammonium sulphate remains in the mother liquor. Said mother liquor is returned to the evaporation process in mixture with fresh solution produced and the mother liquor will thus shortly be saturated with ammonium sulphate whereupon ammonium sulphate crystallizes out together with the ammonium phosphate in quantities corresponding to the percentage of ammonium sulphate contained in the ammonium phosphate solution. The ammonium phosphate produced in the continuation of the process will accordingly in the known process be obtained in mixture with a considerable percentage of ammonium sulphate.

The object of this invention is to remove said drawback and to make it possible to produce continuously a practically pure ammonium phosphate. The invention consists, chiefly, in this that the mother liquor after the crystallization and removal of the solid ammonium phosphate is utilized together with the sulphuric acid in performing the dissolving of the phosphate rock.

The analysis proves that the mother liquor after the crystallization of the ammonium phosphate contains chiefly ammonium sulphate and only a small percentage of ammonium phosphate. For instance, in producing diammonium phosphate as above described the saturated mother liquor will contain about 32% of ammonium sulphate and only about 16% of ammonium phosphate in spite of the fact that the solubility of the said two salts per se is 42% and 36% respectively at room temperature.

In utilizing the mother liquor together with the sulphuric acid in the leaching process its percentage of ammonium sulphate compensates for a corresponding part of sulphuric acid otherwise required. A part of the sulphuric acid reacts with the ammonium phosphate present in the mother liquor to form ammonium sulphate and free phosphoric acid but this is insignificant as it is possible in leaching phosphate rock with sulphuric acid to work with a deficit of sulphuric acid when said deficit is equalized by a corresponding quantity of ammonium sulphate.

When working in accordance with my improved process the mother liquor is never saturated in the evaporation to such extent that ammonium sulphate crystallizes out and, therefore, a pure ammonium phosphate is obtained. At the same time a saving of sulphuric acid is obtained in the leaching process corresponding to the ammonium sulphate contained in the mother liquor returned.

What I claim is:

In a method of producing ammonium phosphate in which phosphate rock is leached with sulphuric acid containing some ammonium sulphate and the phosphoric acid solution produced is neutralized with ammonia to form ammonium phosphate, the steps which comprises crystallizing out substantially pure ammonium phosphate from the neutralized solution by evaporation and cooling and adding the remaining mother liquor consisting chiefly of the saturated solution of ammonium sulphate to the leaching acid in continued performance of the leaching process.

In testimony whereof I have signed my name.

MARKUS LARSSON.